United States Patent [19]

Hedrick et al.

[11] Patent Number: 4,493,907

[45] Date of Patent: Jan. 15, 1985

[54] METHOD OF USING HIGHER CONCENTRATION SULFURIC ACID FOR STRIPPING AND PRECIPITATION OF ADSORBED MAGNESIUM

[75] Inventors: Harold N. Hedrick, Brandon; Solon G. Whitney, Bartow, both of Fla.

[73] Assignee: American Petro Mart, Inc., Bartow, Fla.

[21] Appl. No.: 478,167

[22] Filed: Mar. 23, 1983

Related U.S. Application Data

[63] Continuation-in-part of Ser. No. 386,768, Jun. 10, 1982, abandoned, which is a continuation-in-part of Ser. No. 275,651, Jun. 22, 1981, abandoned.

[51] Int. Cl.³ .................. B01D 15/06; B01J 49/00
[52] U.S. Cl. ..................... 521/26; 210/656; 210/677; 210/687
[58] Field of Search .............. 521/26; 423/157, 167, 423/321 X

[56] References Cited

U.S. PATENT DOCUMENTS

| | | | |
|---|---|---|---|
| 3,342,756 | 9/1967 | Martinola et al. | 521/26 |
| 3,382,035 | 5/1968 | Slater | 423/167 |
| 3,658,699 | 8/1972 | Ryan et al. | 521/26 |
| 3,660,283 | 5/1972 | Ryan | 521/26 |
| 4,228,001 | 10/1980 | Carlson | 210/676 |
| 4,280,904 | 7/1981 | Carlson | 210/684 |
| 4,363,880 | 12/1982 | Whitney et al. | 521/26 |
| 4,385,993 | 5/1983 | Hedrick et al. | 210/675 |

FOREIGN PATENT DOCUMENTS

1033224 6/1966 United Kingdom ................ 521/26

Primary Examiner—Joseph L. Schofer
Assistant Examiner—Peter F. Kulkosky

[57] ABSTRACT

This invention relates to the regeneration of cation exchanger resin containing adsorbed magnesium ions, and the recovery of the magnesium as a crystalline precipitate. The regeneration uses moderate to high concentration aqueous $H_2SO_4$, and the recovered precipitate comprises one or more co-crystallization compounds of $MgSO_4$ and $H_2SO_4$.

12 Claims, 1 Drawing Figure

METHOD OF USING HIGHER CONCENTRATION
SULFURIC ACID FOR STRIPPING AND
PRECIPITATION OF ADSORBED MAGNESIUM

CROSS REFERENCES

This application is a continuation-in-part of co-pending application Ser. No. 386,768, filed June 10, 1982, now abandoned, which was a continuation-in-part of application Ser. No. 275,651, filed June 22, 1981, now abandoned.

BACKGROUND AND PRIOR ART

As is well known in the ion exchange arts, metal ions adsorbed on cation exchange resins can be eluted with aqueous solutions of strong mineral acids, such as hydrocholoric, nitric, and sulfuric acids. The adsorbed metal ions are exchanged for hydrogen ions so that the resin is returned to its hydrogen form for further use in the removal of metal ions from solutions. Commonly, such metal ion elution and cation exchange resin regeneration is carried out with relatively dilute acid solutions, and these are prepared by adding water to commercial concentrations of the regenerating acid. Since concentrated mineral acids produce heat when diluted with water, cooling of the regenerating acid solutions may be required with energy being used for the regeneration. Further, the use of dilute acid solutions results in a large volume of waste solution which presents a disposal problem.

The foregoing problems were encountered in the development of a system for removing principally magnesium and other cations from phosphoric acid, especially phosphoric acid prepared from phosphate rock having relatively high concentrations of magnesium, as is common with lower grades of phosphate rock. The system utilized moving folded beds of cation exchange resin for the adsorption and elution of the magnesium. A system of this kind is described in U.S. Pat. No. 4,280,904. The resin regeneration as described in this patent, is carried out with various acids including sulfuric acid. In experiments conducted prior to the present invention, the elution and regeneration was carried out with 3N sulfuric acid (approximately 17% $H_2SO_4$ concentration). This eluting solution was prepared by adding water to commercial grade sulfuric acid (viz. 93%). The spent eluting solution which contained the removed magnesium together with eluted calcium gave processing and disposal problems. It was difficult and expensive to recover the magnesium as a precipitated solid, and yet it was undesirable to dispose of the large volume of spent eluting solution without further processing. These problems are overcome by the present invention.

Wet process phosphoric acid prepared from phosphate rock will contain organic matter which may adhere to the resin beads as transferred for regneration. It is therefore another important advantage of the method of this invention that such organic matter does not cause any operational problems even though the resin beads are repeatedly regenerated and recycled to the phosphoric acid treating column. The high concentration of $H_2SO_4$ in the regenerating column The high concentration of $H_2SO_4$ in the regenerating column facilitates its removal from the resin beads by the regenerating solution.

REFERENCE TO DRAWING

In the accompanying drawing, FIG. 1 is a diagrammatic flow sheet illustrating a presently preferred embodiment of the method of the present invention for regenerating a cation exchange resin loaded with adsorbed magnesium, and obtaining an $MgSO_4.H_2SO_4$ crystalline product and a concentrated aqueous $H_2SO_4$ by-product for recycle use.

SUMMARY OF INVENTION

In accordance with the present invention, adsorbed magnesium is removed from the cation exchange resin, such as that resulting from the cation exchange resin treatment of phosphoric acid, using a sulfuric acid eluting solution of a higher concentration than conventionally used for resin regeneration. The high acid concentration regenerating solution is introduced into the top of a regeneration column containing a series of increments of the resin for regeneration. In the operation of the column, increments of the magnesium loaded resin are sequentially introduced into the bottom of the column while regenerated resin increments are removed from the top of the column. A magnesium ion-containing sulfuric acid solution is removed from the lower portion of the column at a still relatively high concentration. The use of high acid concentrations reduces the liquid volume required for regeneration, and facilitates the $MgSO_4$ precipitation, while obtaining a concentrated $H_2SO_4$ by-product.

Magnesium is precipitated from the acid solution removed from the regeneration column by adding more highly concentrated sulfuric acid thereto, the $H_2SO_4$ concentration being increased to a level at which magnesium sulfate crystallizes and precipitates. This precipitate comprises co-crystallization compounds of $MgSO_4$ and $H_2SO_4$ having the formula $MgSO_4.xH_2SO_4$ (sometimes referred to herein as the magnesium sulfate precipitate.) Theoretically, the precipitate may contain an average of from 1 to 3 moles of $H_2SO_4$ per mole of $MgSO_4$, but it is desired to approach a 1:1 molar ratio to reduce the $H_2SO_4$ loss. The supernatant from which the precipitate is separated has a sufficiently high concentration of sulfuric acid to permit it to be reused as part of the regenerating solution, or for other purposes, such as in the treatment of phosphate rock in the manufacture of phosphoric acid therefrom.

The regenerated resin increments removed from the top of the column contain sulfuric acid at the high concentration of the incoming regenerating solution. Therefore, an initial water washing of the removed resin can cause serious degradation of the resin, at least with some resins, the resin beads tending to expand as the concentrated sulfuric acid is removed. In a preferred embodiment of the present invention, the removed resin is first washed with aqueous sulfuric acid of intermediate concentration and thereafter washed with water. This staged and more gradual reduction of the acid concentration minimizes fracturing or spalling of the resin beads. Further, all or part of the acid wash and the water wash can be combined to provide additional acid wash solution at a desired intermediate concentration. The excess of the acid wash can be used for dilution of the commercial concentration acid in preparing the stripping column regenerating solution.

DETAILED DESCRIPTION

Figure 1:
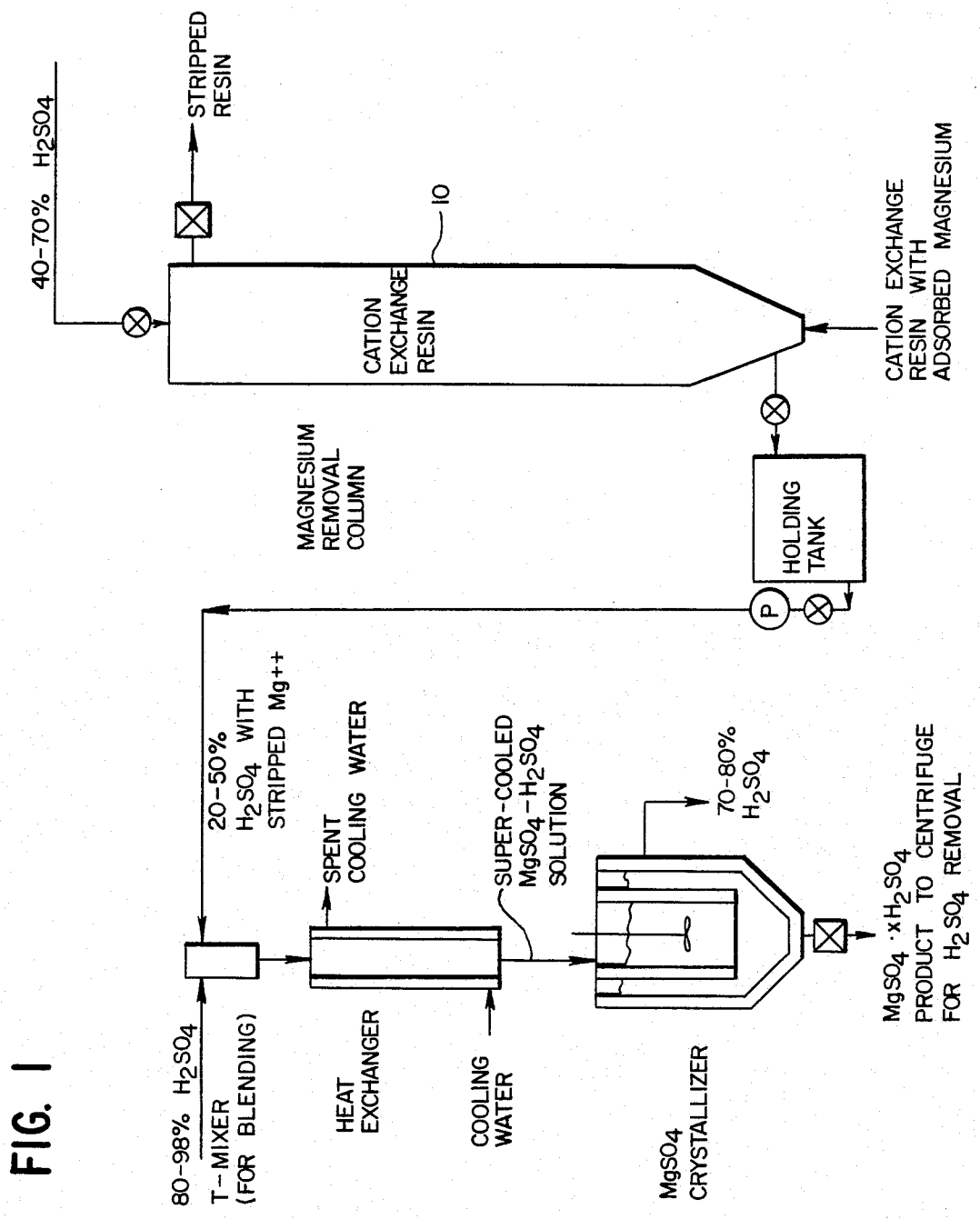

The method of the present invention can be applied to any cation exchange resin where the predominant metal ions adsorbed thereon are magnesium ions to be removed in the regeneration column. Further, the method is applicable to the elution of magnesium adsorbed on a wide variety of cationic exchange resins. For example, a crosslinked polystyrene aryl sulfonate resin can be used. Resins are preferred which can be used with high concentrations of $H_2SO_4$. Where the loaded resin contains more than one mole of calcium per 10 moles of magnesium, it is desirable to first remove part of the calcium from the resin while leaving the magnesium adsorbed thereon. The calcium to magnesium ion ratio is preferably reduced to at least 1:9 and optimally below 1:20. Calcium precipitation as a hydrate thereof can occur within the magnesium removal column. It is desired to minimize such precipitation, and to recover the Mg separately from the $CaSO_4$.

The method of this invention is preferably employed in conjunction with a moving folded bed apparatus but can be utilized in fixed bed systems as well as other resin handling systems. Folded bed system are described in U.S. Pat. Nos. 4,228,001 and 4,280,904, and in pending application Ser. No. 275,658, filed June 22, 1981, now U.S. Pat. No. 4,385,993. For the purpose of the present invention, the important feature of such folded moving bed systems is that the loaded resin is removed in increments from the top of the loading column, and either with or without further processing to remove the calcium, is introduced into the bottom of the magnesium removal column, the removal column introduction also being incremental. The resin increments may be transferred as a slurry using pump pressure and a liquid transport medium, as described in U.S. Pat. Nos. 4,228,001 and 4,280,904, or preferably an air-pulse transfer mechanism is used, and the resin is transferred in compacted increments, as described in application Ser. No. 275,658, now U.S. Pat. No. 4,385,993.

In the magnesium removal column, increments of the magnesium containing cation exchange resin are sequentially introduced into the bottom of the column for regeneration of the resin. Regenerated increments of the resin are sequentially removed from the top of the column. Preferably, with each incremental introduction into the bottom of the column a resin increment of corresponding volume is removed from the top of the column. When the column is fully packed with resin, as preferred, this will automatically be accomplished, the pulsed increment of resin introduced into the bottom of the column automatically causing the ejection of a corresponding resin increment from the top of the column. The magnesium removal column will contain a plurality of increments in the form of resin bands or layers moving from the bottom to the top of the column, and being progressively regenerated by the magnesium removal as they ascend in the column. For example, the column may contain from 5 to 10 of such increments.

In accordance with the present invention, there is introduced into the top of the regeneration column an aqueous sulfuric acid regenerating solution of relatively high concentration. The regenerating solution preferably has a concentration of from 40 to 70% or higher. A typical concentration is from 50 to 60%. Higher concentrations within the range of 70 to 95% or up to 100% (oleum) can be used, if spalling of the resin beads can be avoided. Advantageously, a concentration of at least 40% is used and even better results are obtained with concentrations of at least 50%. (Concentrations of $H_2SO_4$ are weight percents). At the point of its introduction, the regenerating solution is passed downwardly through upper increments of the resin, thereby assuring completion of the regeneration of the resin increments before they are removed from the column. Usually, although not necessarily, the first resin increment contacted will be the uppermost increment immediately prior to its removal, the regenerating solution being introduced into the top of the column.

The regenerating solution may percolate through the regenerating column under gravitational action, or its flow may be assisted by pump pressure. The flow may be continuous, but is preferably interrupted during the introduction and removal of the resin increments. Concurrently with the introduction of the regenerating solution into the upper portion of the column, a magnesium ion-containing aqueous sulfuric acid solution is removed from the lower portion of the column. The acid concentration of the regenerating solution decreases as the hydrogen ions of the acid are exchanged for the magnesium so that the removed solution will have a substantially lower acid concentration, such as a concentration of from 20 to 50% $H_2SO_4$ by weight. The $H_2SO_4$ concentration will be reduced as it moves down the column. A differential concentration of at least 10–20% or more is desirable, such as from 50% on introduction to 30 to 40% on removal. The concentration of the $H_2SO_4$ solution containing the eluted magnesium as removed from the bottom of the column can range from 10 to 60%, depending on the concentration of the regenerating solution at the top of the column.

The removed solution containing the eluted magnesium is at a concentration where the magnesium sulfate is highly soluble. However, the $MgSO_4$ can be readily precipitated therefrom by increasing the sulfuric acid concentration. For example, this can be accomplished by adding concentrated aqueous sulfuric acid thereto, such as sulfuric acid having a concentration of at least 80%, the amount of concentrated $H_2SO_4$ required being determined by the amount and acid concentration of the magnesium containing solution. The concentration of the $H_2SO_4$ can also be increased by the addition of $SO_3$ gas to form $H_2SO_4$ in situ. Since more magnesium sulfate can be precipitated from a solution containing a high concentration of magnesium, the volume of regenerant is preferably kept low, while the acid concentration and magnesium content are correspondingly high. For example, in one embodiment, after preparation and seeding of the solution, the magnesium sulfate is precipitated in an $H_2SO_4$ concentration of from 70 to 80%. The supernatant solution, at a corresponding $H_2SO_4$ concentration, can be separated from the magnesium sulfate precipitate, or separately removed, and used for other purposes. For example, the $H_2SO_4$ solution at a concentration of from 70 to 80% is suitable for use in fertilizer plant phosphate rock digestion, or can be reused as the column regenerating solution. In an advantageous embodiment, 80 to 95% $H_2SO_4$ or higher, is added to the solution removed from the column, which increases the $H_2SO_4$ concentration of the solution and also raises its temperature in preparation for the precipitation step. The temperature in the crystallizer is desirably maintained above 75° F. (23.9° C.), such as within the range from 75° to 100° F. (23.9° to 37.8° C.), or higher. Temperatures of up to 150°–160° F. (65.6° to 71.1° C.) can be used.

The present invention also preferably involves a procedure for washing the regenerated resin increments after their removal from the top of the regeneration column. As removed, the resin increments will contain sulfuric acid at the concentration of the regenerating solution in the upper portion of the column, such as 40 to 70% $H_2SO_4$. In removing the sulfuric acid solution from the regenerated resin preparatory to the reuse of the resin for further processing of phosphoric acid, it is preferred to first wash the removed resin with aqueous sulfuric acid at a concentration of from 20 to 50% $H_2SO_4$ by weight. Optionally, a second acid wash, at a lower concentration than the first wash is used before the resin is washed with water. Preferably, at least part of the acid and water washes after removal from the resin are combined for reuse as the acid wash for further increments of regenerated resin.

The effluent from the first wash, being of highest acid concentration can be reused. Further, at least part of the combined wash solutions can be used for dilution of a 95% sulfuric acid starting material. For example, the combined washes at concentrations of from 20 to 70% $H_2SO_4$ by volume may be mixed with portions of the removed supernatant from the magnesium sulfate precipitation.

With the resin wash procedure described, rapid changes in the concentration of $H_2SO_4$ in contact with the resin beads are avoided. For example, as removed, the sulfuric acid in contact with the resin may have a concentration of 50%. The first acid wash may comprise sulfuric acid of a concentration of 30%, and that wash solution will be removed by the final water wash. Such staged reduction of sulfuric acid concentration tends to avoid degradation of the resin beads, such as by fracturing or spalling of the beads.

FLOW SHEET EXAMPLE

As shown in FIG. 1, the cation exchange resin with the adsorbed magnesium is introduced into the bottom of the magnesium removal column 10. The column, for example, may contain seven resin increments, the resin beads being packed and filling the column from top to bottom. The uppermost increment is contacted with the incoming regenerating solution (viz. 40–70% $H_2SO_4$). The newly introduced increment at the bottom of the column is contacted with the $H_2SO_4$ solution of reduced concentration (viz. 20–50% $H_2SO_4$), which is being removed from the column bottom through a valve-controlled line. This solution contains the magnesium ions, and is transferred to $MgSO_4$ precipitation.

As each new increment of resin is introduced into the column an increment of corresponding volume is ejected from the upper portion of the column through a line provided with an appropriate resin valve, being transferred to a resin receiving vessel (not shown) for further processing.

In the receivor vessel, the regenerated increment of resin beads is treated to remove the residual concentrated sulfuric acid (40–70% $H_2SO_4$). In a preferred sequence, the free sulfuric acid liquid is first expelled from the resin by the introduction of compressed air, the expelled liquid being discharged through a valve-controlled outlet line. The resin is then washed with aqueous $H_2SO_4$ of intermediate concentration (viz. 30–40% $H_2SO_4$). If needed to avoid damage to the resin beads, a further lower concentration acid wash can then be used (viz. 5–20% $H_2SO_4$). Water is used as the final wash, and the resin beads are dried in the receiver by a compressed air expulsion of the liquid. The dried resin may be rewet with product $H_3PO_4$ and passed to a regenerated resin transfer vessel (not shown).

In transferring the resin increment from the resin receiver vessel, the resin valve on the line to the regenerated resin transfer vessel is opened, and the resin increment falls into the lower vessel, which may contain a pool of product $H_3PO_4$. The transfer can be accomplished by air pressure generated in the resin receiver vessel, and/or by introducing liquid into the resin receiver vessel, such as the product phosphoric acid (after removal of the magnesium and calcium).

In one mode of operation, the Mg ion solution of 20 to 50% $H_2SO_4$ is removed from the bottom of the column and passed to a crystallization operation. The removed Mg solution may be first passed to a holding tank, as shown in FIG. 1, and then transferred, as required to the Mg recovery operation.

As illustrated in FIG. 1, the sulfuric acid solution containing the magnesium may be passed to a T-mixer where it is blended with aqueous $H_2SO_4$ of 80–98% concentration. The added $H_2SO_4$ may be commercial grade $H_2SO_4$ of 93% concentration. This mixing will result in dilution heating, such as to a temperature of 160°–180° F. (71.1° to 82.2° C.). All of the magnesium sulfate remains in solution at the temperature of the heated mixture. The mixture is then passed through a heat exchanger, such as a water cooled indirect heat exchanger, as illustrated. The temperature is reduced to a temperature at which the $MgSO_4$ will precipitate as a co-crystallization compound with $H_2SO_4$. A temperature in the range of 110°–130° F. (43.3° 54.4° C.) is presently believed to be the most desirable, but lower or higher temperatures can be used. The sulfuric acid concentration of the blend can range from 70 to 80% $H_2SO_4$. The presently preferred concentration for the crystallization is in the range from 72 to 74% $H_2SO_4$. The cooling in the heat exchanger may be to a temperature below the crystallization temperature, resulting in a super-cooled solution.

The design of the $MgSO_4$ crystallizer can be in accordance with known crystallizer apparatus design. In the diagrammatic illustration of the drawing, the crystallizer is shown with a central cylinderical chamber provided with an agitator into which the cooled mixed solution is introduced. Seed crystals like the desired magnesium sulfate product may be introduced to promote the crystallization. The crystalline product falls to the bottom of the crystallizer as a precipitate, and collects in the conical bottom portion, as indicated. The crystalline product may be periodically removed therefrom through a bottom solids-handling, valve-controlled outlet. The by-product of concentrated sulfuric acid may be removed from a side outlet connected to the annular space outside of the central crystallizer region. Preferably, the concentration of the aqueous sulfuric acid in the crystallizer maintained at a concentration of from 70 to 80%. The crystallizer temperatures will correspond with the temperatures of the cooled solution as introduced to the crystallizer, the crystallizer thereby preferably being operated with the solution therein at a temperature of the range from 110° to 130° F. (43.3° to 54.4° C.)

The resulting crystalline product will be a co-crystallization complex of magnesium sulfate and sulfuric acid having the general formula $MgSO_4 \cdot x\, H_2SO_4$ in which "x" represents the number of moles of $H_2SO_4$ per mole of $MgSO_4$. Theoretically, there are two crystalline forms, one containing one mole of $H_2SO_4$ and the other three moles. However, it is believed that the product produced by the present invention is composed primarily of the equal molar co-precipitation compound. The amount of the three molar compound present, if any, is not known with certainty. Analysis is complicated by the fact that the product as removed contains entrained sulfuric acid. The entrained sulfuric acid may be at least partially removed by centrifugation. Therefore, it is preferable to pass the solids removed from the crystallizer to a centrifuge for removal of free aqueous sulfuric acid, which will have the concentration of the supernatant in the crystallizer. Following centrifugation, the solids may contain total sulfuric acid, representing either co-crystalline sulfuric acid or residual free sulfuric acid, as low as 1.1 to 1.3 moles of total sulfuric acid per mole of $MgSO_4$.

In general, the by-product aqueous sulfuric acid removed as supernatnat from the crystallizer preferably has a concentration of from 70 to 80% $H_2SO_4$. Using the preferred conditions described above, the by-product acid will have a concentration of from 72 to 74% $H_2SO_4$.

We claim:

1. In a folded bed ion exchange system for removing magnesium ions from aqueous phosphoric acid prepared by the wet process from phosphate rock, the method of regenerating a cation exchange resin loaded with adsorbed magnesium ions and precipitating the stripped magnesium ions, comprising:
    (a) sequentially introducing increments of said loaded resin into the bottom portion of a regeneration column while sequentially removing regenerated increments of said resin from the top portion of said column, said increments sequentially moving upwardly in said column from the bottom to the top thereof;
    (b) introducing an aqueous sulfuric acid ($H_2SO_4$) regenerating solution into the top portion of said column at a concentration of 40% or higher $H_2SO_4$ by weight and passing said regenerating solution downwardly within said column, the $H_2SO_4$ concentration of said regenerating solution progressively decreasing as said solution flows downwardly through the upwardly moving resin increments, whereby the most recently introduced increment in the column bottom portion is in contact with an $H_2SO_4$ solution of relatively low concentration while the increment in the top portion prior to its removal is in contact with an $H_2SO_4$ solution of relatively high concentration;
    (c) removing a magnesium ion-containing sulfuric acid solution of reduced $H_2SO_4$ concentration from the lower portion of said column, said removal acid concentration being at least 10 to 20% lower than the introduction concentration and below a concentration at which the magnesium ions precipitate; and
    (d) precipitating magnesium sulfate from said removed solution by increasing the $H_2SO_4$ concentration of said solution to a sufficiently high $H_2SO_4$ concentration to cause the magnesium sulfate to form a solid crystalline compound.

2. The method of claim 1 in which said regenerating solution as introduced into said column has a concentration of 40 to 70% $H_2SO_4$ by weight.

3. The method of claim 1 in which said $H_2SO_4$ solution as introduced in step (b) has a concentration of at least 50%, and in step (d) aqueous $H_2SO_4$ is added which has a concentration of at least 80%.

4. The method of claim 1 in which said magnesium sulfate is precipitated at a concentration of at least 70% $H_2SO_4$ by weight, and a supernatant solution of at least 70% $H_2SO_4$ by weight is separated from the said precipitate.

5. The method of claim 1 in which said resin for regeneration contains adsorbed calcium ions together with the magnesium ions but not over one mole of calcium being present per each 9 moles of magnesium.

6. The method of claim 1 in which said resin for regeneration contains organic matter from the phosphate rock used to prepare the wet process phosphoric acid.

7. The method of claim 1 in which said resin for regeneration contains adsorbed calcium ions together with the adsorbed magnesium ions but not over one mole of calcium being present per each 9 moles of magnesium, and in which said resin contains organic matter from the phosphate rock used to prepare the wet process phosphoric acid.

8. The method of claim 1 in which the resin increments removed from the top of said column contain sulfuric acid at the high concentration of the regenerating solution as introduced, and in which the removed increments are first washed with aqueous sulfuric acid of an intermediate concentration with respect to the regenerating solution and water and thereafter washed with water.

9. The method of regenerating a cation exchange resin loaded with adsorbed magnesium ions and precipitating the stripped magnesium ions, comprising:
    (a) sequentially introducing increments of said loaded resin into the bottom of a regeneration column while sequentially removing regenerated increments of said resin from the top of said column, said increments sequentially moving upwardly in said column from the bottom to the top thereof;
    (b) introducing an aqueous sulfuric acid ($H_2SO_4$) regenerating solution into the upper portion of said column at a concentration of at least 50% by weight and passing said regenerating solution downwardly within said column, the $H_2SO_4$ concentration of said regenerating solution progressively decreasing as said solution flows downwardly through the upwardly moving resin increments, whereby the most recently introduced increment in the column bottom portion is in contact with an $H_2SO_4$ solution of relatively low concentration while the increment in the top portion prior to its removal is in contact with an $H_2SO_4$ solution of relatively high concentration;
    (c) removing a magnesium ion-containing sulfuric acid solution from the lower portion of said column at a concentration of at least 20% $H_2SO_4$ by weight lower than the introduction concentration and below a concentration at which the magnesium ions precipitate; and
    (d) precipitating magnesium sulfate from said removed solution by adding concentrated sulfuric acid thereto having an $H_2SO_4$ concentration of at least 80% by weight to cause the magnesium sulfate to crystallize as a co-crystallization compound of $MgSO_4$ and $H_2SO_4$.

10. The method of claim 9 in which said resin for regeneration contains adsorbed calcium ions together with the adsorbed magnesium ions but not over one mole of calcium being present per each 9 moles of magnesium, said resin also containing organic matter from the phosphate rock used to prepare the wet process phosphoric acid.

11. The method of claim 9 in which said precipitation is carried out at an $H_2SO_4$ concentration of from 70 to 80% by weight, and by-product sulfuric acid is obtained at a corresponding concentration.

12. In a folded bed ion exchange system for removing magnesium ions from aqueous phosphoric acid prepared by the wet process from phosphate rock, the method of regenerating a cation exchange resin loaded with adsorbed magnesium ions and precipitating the stripped magnesium ions, comprising:

(a) sequentially introducing increments of said loaded resin into the bottom portion of a regeneration column while sequentially removing regenerated increments of said resin from the top portion of said column, said increments sequentially moving upwardly in said column from the bottom to the top thereof, said resin as introduced into said column containing adsorbed calcium ions together with the adsorbed magnesium ions but not over one mole of calcium being present per each 9 moles of magnesium, and also containing organic matter from the phosphate rock used to prepare the wet process phosphoric acid;

(b) introducing an aqueous sulfuric acid ($H_2SO_4$) regenerating solution into the top portion of said column at a concentration of at least 50% $H_2SO_4$ by weight and passing said regenerating solution downwardly within said column, the $H_2SO_4$ concentration of said regenerating solution progressively decreasing as said solution flows downwardly through the upwardly moving resin increments, whereby the most recently introduced increment in the column bottom portion is in contact with an $H_2SO_4$ solution of relatively low concentration while the increment in the top portion prior to its removal is in contact with an $H_2SO_4$ solution of relatively high concentration;

(c) removing a magnesium ion-containing sulfuric acid solution of reduced $H_2SO_4$ concentration from the lower portion of said column, said removal acid concentration being at least 10 to 20% lower than the introduction concentration and below a concentration at which the magnesium ions precipitate;

(d) precipitating magnesium sulfate from said removed solution by adding concentrated sulfuric acid thereto having an $H_2SO_4$ concentration of at least 70% by weight to cause the magnesium sulfate to form a solid crystalline compound; and (e) separating the crystalline precipitate and also recovering an $H_2SO_4$ solution of at least 70% by weight concentration.

* * * * *